Patented Aug. 25, 1953

2,650,253

UNITED STATES PATENT OFFICE 2,650,253

PRODUCTION OF HIGHER KETONES

Frederick F. Rust, Orinda, and William E. Vaughan, Berkeley, Calif., assignors to Shell Development Company, Emeryville, Calif., a corporation of Delaware No Drawing. Application April 27, 1951, Serial No. 223,458

7 Claims. (Cl. 260—597)

This invention relates to a method for the synthesis of long-chain aliphatic ketones and it more particularly relates to a method for the synthesis of aliphatic monoketones containing eight and more carbon atoms in the molecule by a reaction, effected under controlled conditions in the presence of suitable catalysts, of normal olefins containing at least six carbon atoms in the molecule and aldehydes.

Higher aliphatic monoketones, containing eight or more carbon atoms in the molecule, are known to be valuable high-boiling solvents that are useful for special applications in the formulation of surface-coating compositions, such as lacquers. Such higher ketones are also variously useful as plasticizers, e. g., for synthetic resins, in the perfumery art, and in other commercially important applications. Methods for the synthesis of ketones have been the subject of extensive investigation, and numerous processes have been proposed. Many of the processes heretofore known, however, have been useful primarily for the production of lower ketones, such as ketones containing from three to five carbon atoms, e. g., acetone and its near higher homologs. Others of the known processes have been limited for practical purposes to laboratory-scale use, due either to the expense of the necessary reagents or the number of processing steps that are required. Still others of the known processes, because of the large capital outlay required for the necessary equipment, are limited by economic factors to the production of ketones for which there is a very large, established market. There has been need for a practical method for the synthesis of higher aliphatic ketones that can be employed on a moderate commercial scale utilizing only readily available starting materials and that can be carried out in the standard, relatively low-cost equipment that is generally available to the chemical industry without installation of special processing facilities.

It now has been discovered in accordance with the present invention that higher aliphatic monoketones, containing eight and more carbon atoms in the molecule, can be synthesized in a direct, uncomplicated, and efficient manner by reaction between alpha-monoolefins containing at least six, and preferably eight or more, carbon atoms in the molecule and aldehydes under controlled conditions in the presence of free radical reaction initiators, i. e., of sensitizers or reaction initiators which generate free radicals in the reaction mixture.

The process of the invention is carried out by heating the alpha-monoolefin and the aldehyde together in liquid phase in the presence of an added free radical reaction initiator. The olefins that are used in accordance with the invention are alpha-monoolefins containing at least six, and preferably at least eight, carbon atoms in the molecule, i. e., olefins of the structure R—CH=CH$_2$ wherein R is an alkyl radical having at least four, and preferably at least six carbon atoms. These olefins, unlike the lower normal olefins such as ethylene, the tertiary-base olefins, and also the diolefins, are resistant to polymerization to high molecular weight polymers in the presence of polymerization catalysts containing peroxygen. They are readily available from the petroleum industry. They now can be converted in good yields to the more valuable higher ketones by reaction with aldehydes according to this invention. Illustrative alpha-olefins that can be employed in accordance with the process of this invention are 1-hexene, 1-heptene, 1-octene, 1-nonene, 1-decene, 1-hendecene, 1-dodecene, 1-tridecene, 1-tetradecene, 1-pentadecene, 1-hexadecene, 1-heptadecene, 1-octadecene, 1-nonadecene, 1-eicosene, and their higher homologs. The olefin preferably contains from 8 to 20 carbon atoms, inclusive. Although the normal olefins have been specifically mentioned, corresponding branched-chain olefins having the structure R—CH=CH$_2$ may be used. Thus, although R preferably is a normal alkyl group of from 6 to 18 carbon atoms, it may also represent a branched-chain alkyl group having from 6 to about 18 carbon atoms. The individual olefins may be used in substantially the pure state. Mixtures of such olefins and mixtures predominantly comprising alpha-olefins of the foregoing type may also be used. An example of such a mixture is the mixture of normal alpha-olefins obtained by cracking a petroleum or equivalent paraffinic wax, as well as the fractions of relatively narrow desired boiling range that can be separated from mixtures of olefins produced in this manner.

As the aldehyde reactant there may be used any suitable aldehyde of the structure R—CHO in which R is a suitable organic radical. Generally suitable are the saturated aliphatic aldehydes, particularly those containing from 2 to 18 or more carbon atoms. The preferred aldehydes are the alkanals, and of the alkanals those containing from 2 to 8 carbon atoms, inclusive, are particularly preferred. Typical aldehydes that can be used are acetaldehyde, propionaldehyde, n-butyraldehyde, isobutyraldehyde, trimethylacetaldehyde, n-valeraldehyde, isovaleraldehyde, n-caproaldehyde, n-heptaldehyde, 2-ethylhexanal, and the like. The aldehyde may contain inert substituents if desired, or a cyclic structure, as in methoxyacetaldehyde, furfural, and phenylacetaldehyde, although the unsubstituted alkanals, R—CHO, R being an alkyl group containing from 1 to 6 carbon atoms, are particularly preferred. As the free radical reaction initiator, from which free radicals are generated in the reaction mixture, there can be employed peroxides, such as an organic or inorganic peroxide, positive halogen compounds, such as N-2,4-trichlorobenzanilide and ethyl 1-bromomalonate, compounds which form free radicals under the influence of heat and/or actinic light, such as azomethane, hydrazine derivatives, and the like. Actinic light alone may be used as the generator of free radicals in the reaction mixture. The per compounds, particularly the organic peroxides, are preferred as the free radical reaction initiators. Illustrative organic peroxides are tertiary alkyl peroxides, such as di-tertiary-butyl peroxide, di-tertiary-amylperoxide, tertiary-butyl tertiary-amyl peroxide, tertiary-butyl tertiary-hexyl peroxide, 2,2-bis(tertiary-butyl - peroxy)butane, 2,2 - bis(tertiary - butyl-peroxy)propane, methyl tertiary-butyl peroxide, ethyl tertiary-amyl peroxide, isopropyl tertiary-amyl peroxide and n-butyl tertiary-butyl peroxide; tertiary alkyl esters of per-acids, such as tertiary-butyl perbenzoate, tertiary-amyl perfuroate, tertiary-butyl peracetate, tertiary-butyl perstearate, tertiary-butyl perundecylenate, tertiary-butyl percrotonate, di-tertiary-butyl dipersuccinate, di-tertiary-butyl diperoxalate, di-tertiary-butyl dipermalonate, di-tertiary-butyl diperphthalate, and di-tertiary-butyl diperadipate. Peroxides which contain other than a tertiary alkyl group linked to the peroxy group may be employed, such as diacyl peroxides, e. g., dibenzoyl peroxide, diacetyl peroxide, acetyl benzoyl peroxide; normal and secondary alkyl peroxides, such as diethyl peroxide and diisopropyl peroxide. Hydroperoxides may be employed as the source of the necessary free radicals, e. g., tertiary-butyl hydroperoxide, tertiary-amyl hydroperoxide, and triphenylmethyl hydroperoxide, as well as per-salts, such as alkali persulfates and perborates, and also hydrogen peroxide.

In carrying out the process of the invention, the olefin, the aldehyde, and the sensitizer or reaction initiator, along with an inert diluent or solvent if desired, such as an isooctane, benzene, or other saturated or aromatic hydrocarbon solvent, or water, are charged to the reaction vessel in suitable proportions. Generally speaking, the aldehyde and the olefin may be furnished in mole ratios throughout the range of from about 1:20 to about 20:1. A preferred general range is from about 1:5 to about 5:1. It has been found that as the amount of the aldehyde charged to the reactor is increased upwardly from about one mole per mole of the olefin, there is a tendency for the aldehyde to enter into a side reaction that leads to formation of carbon monoxide and of saturated hydrocarbon. This side reaction can be minimized by operating at mole ratios of aldehyde to olefin not greater than about 2.5:1. On the other hand, as the amount of aldehyde is decreased, the conversion of the olefin charged falls off. In the absence of aldehyde, only negligible conversion of the olefin occurs. According to the preferred practice of the invention not less than about 0.5 mole of aldehyde per mole of olefin is charged to the reactor. Additional amounts of the aldehyde or olefin, or of both, may be added to the reaction mixture either continuously or intermittently as the reaction progresses.

The amount of the reaction initiator charged is not known to be critical. Generall speaking, amounts of the initiator or sensitizer from about 1% to about 25% of the weight of the reactants can be used, the range of from about 1% to about 5% being preferred.

The reaction temperature that is used may be from about the ambient or room temperature (20° C.) up to 200° C. or more, a preferred temperature range being from about 65° C. to about 150° C. When an organic peroxide is employed as the reaction initiator or sensitizer, it is necessary that the reaction temperature be above a limiting minimum temperature that is dependent upon the particular peroxide that is used. The temperature in each case must be at least as high as that temperature at which appreciable decomposition of the peroxide productive of free radicals occurs. For example, with benzoyl peroxide as the reaction initiator, an effective temperature range is approximately 65° C. to 95° C., while with di-tertiary-butyl peroxide as the reaction initiator an effective temperature range is from about 110° C. to about 150° C. In the intermediate temperature range of 80° C. to 120° C., such a peroxidic compound as 2,2-bis(tertiary-butyl-peroxy)butane may be used. In general, as the reaction temperature is increased the consumption of aldehyde in side reactions nonproductive of desired ketone tends to increase. On the other hand, at low reaction temperatures the reaction tends to be slow. We have found that the tertiary hydrocarbon peroxides, which decompose to form free radicals at optimum temperature, are highly efficacious when used as the free radical reaction initiator. The tertiary hydrocarbon peroxides are those organic peroxides that contain at least one hydrocarbon radical containing a tertiary carbon atom, which hydrocarbon radical is directly linked to the peroxy (—O—O—) group by a bond from a tertiary carbon atom. When the reaction initiator is a material that yields free radicals under the influence of, for example, actinic light, the reaction may be carried out with deliberate exposure of the reaction mixture to actinic light, for example, from an artificial source of ultraviolet light, and the reaction may be conducted at normal room temperatures.

The reaction may be conducted at atmospheric pressures or at pressures above or below the atmospheric pressure. Thus, if the reaction temperature approaches or exceeds the boiling point of the reaction mixture under atmospheric pressures, the reaction desirably is carried out under moderate pressure in a closed vessel whereby volatilization from the reaction mixture is prevented. Although pressures up to 1500 pounds or more per square inch may be used, it is particularly desirable to employ pressures not over above 500 pounds per square inch, since undesired side reactions are thereby minimized and the necessity for expensive high pressure equipment is eliminated. In general, a reaction time of from a few minutes up to about 24 hours is productive of practical yields of the desired ketone. In many cases, good yields of desired ketone have been found to be obtained when the reaction time does not exceed the desirably short period of about 6 hours. The optimum reaction temperature depends upon the particular conditions of temperature, amounts of reactants, kind and amount of reaction initiator, and upon similar considerations. The desired ketone can be recovered from the resulting mixture by any convenient method, fractional distillation being a generally convenient method. It is preferable to destroy or remove any peroxide remaining in the reaction mixture before distillation to recover the product. This may be done, for example, by a preliminary azeotropic distillation, as in the presence of added aqueous tertiary-butyl alcohol in the case of di-tertiary-butyl peroxide, or by reaction with added potassium iodide, as in the case of such easily reduced peroxides as dibenzoyl peroxide.

The method of synthesis provided by the present invention may be carried out either batchwise, intermittently or in a continuous manner.

The following examples will serve to illustrate various specific embodiments of the present invention. It will be appreciated that the examples are presented with the intent to illustrate the invention rather than to limit same as it is more broadly defined in the appended claims.

*Example I*

This and the following examples were carried out in closed pressure-resistant vessels of about twice the liquid volume of the charge, equipped with pressure-release means by which the pressure was maintained below a desired maximum value. The reaction vessel, after charging the reactants and initiator, was closed and immersed in an oil bath heated at the desired reaction temperature. During the heating, gaseous by-products, if any, were bled from the vessel as necessary to prevent excessive rise in the pressure. After the predetermined reaction time, the reaction vessel was removed from the oil bath, cooled, opened, and the contents treated for recovery of product.

In this first example there were charged to the reaction vessel 173 grams of n-butyraldehyde, 91.5 grams of octene-1, and 6.3 grams of benzoyl peroxide. The mixture was heated in the closed vessel for 4 hours at 78° C. at pressures not exceeding about 30 pounds per square inch. The resulting product was fractionally distilled in vacuo first under a sufficient vacuum to enable distillation of unreacted aldehyde below the decomposition temperature of benzoyl peroxide (75° C. to 80° C.), and then by distillation at higher temperatures. It was found that 42.4% of the octene-1 charged had been consumed. The fraction distilling at 73.8° C. to 74.2° C. under 2 millimeters mercury pressure was separated as propyl octyl ketone. The yield of propyl octyl ketone based on the consumed olefin was about 40%.

*Example II*

To a reaction vessel as described in Example I there were charged 112 grams of 1-octene, 145 grams of propionaldehyde, and about 12 grams of benzoyl peroxide. The mixture was heated in the closed vessel, which was provided with a safety-valve set to open at 500 p. s. i., at 90° C. for 2 hours and then distilled to recover the product. There was recovered an about 64% yield, based upon the total volume of the products, of ketone fraction consisting essentially of octyl ethyl ketone.

It has been proposed to polymerize such readily polymerizable hydrocarbons as ethylene, propylene and the butylenes in the presence of an added aldehyde or ketone and a peroxidic polymerization catalyst to produce high molecular weight modified polymers that have come to be known as telomers. The present reaction is distinctly different from and is not to be confused with this so-called telomerization reaction. The difference is shown by the next example. In U. S. Patent No. 2,432,287, granted to Cramer on December 9, 1947, it is shown in Example III that the telomerization of propionaldehyde and ethylene produces a complex mixture of products that can be separated into steam-volatile and non-volatile components. The steam-volatile portion was found to give a positive test for the aldehyde group showing that it was aldehydic in structure. Unlike the telomerization reaction, the reaction of propionaldehyde with a typical higher alpha-monoolefin, 1-octene, according to the present invention forms a ketonic material. This is shown in the following example. The formation of practical yields of volatile higher ketone by addition of one molecule of aldehyde to one molecule of olefin, as effected by the process of this invention, was a most surprising result that is considered not to have been predictable from the formation of aldehydic volatile products in the reaction of aldehydes and olefins in accordance with this known telomerization reaction.

*Example III*

To the reaction vessel there were charged 32 grams of propionaldehyde, 63 grams of 1-octene, and 3.2 grams of di-tertiary-butyl peroxide. The resulting mixture was heated in the closed vessel, which was provided with a safety-valve set to open at 500 p. s. i., at 120° C. for 5 hours. At the end of this time 40% of the octene charged had been consumed. The resulting mixture was steam-distilled to separate the steam-volatile products. The steam-volatile product was found by analyses, refractive index, boiling point, melting point of the semi-carbazone and by spectroscopic analyses to be octyl ethyl ketone. The identifying properties of the product are shown in the following table:

|  | Found | Calculated or From Literature |
|---|---|---|
| Carbon, percent by weight. | 76.2% | 77.6%. |
| Hydrogen, percent by weight. | 12.8% | 12.9%. |
| Refractive Index ($n_D$). | 1.4296% (20°) | 1.4306 (17°). |
| Boiling Point, 760 millimeters Hg. | 225–229 | 227. |
| Melting Point of Semicarbazone. | 92° C | 89–92° C. |
| Spectroscopic Analyses. | >CO is only polar group. No C=C. Band at 13.85µ indicates presence of normal chain of more than 4 carbon atoms on one side of the >CO group. |  |

That the method of the present invention differs from the so-called telomerization process is further shown by the fact that, under the conditions here used, negligible, if any, conversion of the olefin occurs in the absence of the aldehyde reactant. This is illustrated in the following example.

*Example IV*

The example consists of three experiments. In each experiment the amount of aldehyde and/or olefin shown in the following table was added to the reaction vessel, 2 mole per cent of benzoyl peroxide based upon the aldehyde and olefine charged was added, and the resulting mixture was heated for 2 hours at 80° C. as in Example II. In each experiment the reaction vessel then was opened and the products distilled. The following results were observed.

| Moles Added at Start | | Volume of Products Boiling Above 120-123° C., cc. |
|---|---|---|
| Propionaldehyde | Octene-1 | |
| 0.547 | 0.547 | 16.3 |
| 0.547 | 0 | 6.0 |
| 0 | 0.547 | 2.0 |

Since the reported boiling point of 1-octene is 122.5° C. (Egloff, G., Physical Constants of Hydrocarbons, Reinhold (1939)) and since the reported boiling point of propionaldehyde is 49.5° C. under 740 millimeters mercury pressure (Beilstein's Handbuch der Organischen Chemie, Berlin (1918), volume 1, page 629), the indicated results demonstrate that only negligible, if any, reaction, e. g., polymerization of either the aldehyde or the olefin, occurred in the absence of the other reactant. Benzoyl peroxide and its decomposition products accounted for a substantial portion of the non-volatile material in the second and third of the three experiments described in the table.

Example V

There were charged to the reaction vessel used in Example II propionaldehyde and 1-hexene in equimolar amounts and 2 mole per cent of di-tertiary-butyl peroxide based upon the total number of moles of the aldehyde and olefin. The mixture was heated in the closed vessel at 123° C. for 19.33 hours. The mixture then was steam-distilled and the dried organic distillate was fractionated by distillation at atmospheric pressure. The main product was found to be ethyl hexyl ketone, its identity being established by the following analytical determinations.

| | Found | Literature |
|---|---|---|
| Boiling Point, 769 mm. Hg _____ ° C__ | 188-190 | 190 |
| Specific Gravity (20/4) _____ | 0.8215 | 0.825 |
| Refractive Index (n20/D) _____ | 1.4213 | |
| Melting Point of Semicarbazone ____ ° C__ | 111.2 | 111-112 |
| Refractive Index (n20/D) of oxime _____ | 1.4535 | 1.4552 |

Example VI

In the reaction vessel described in Example II there were placed 37 grams of propionaldehyde, 54 grams of 1-hexene, and 3 grams of diacetyl peroxide. The reaction vessel was heated at 80° C. for 5 hours. At the end of this time some 30% of the olefin had reacted, the major product being ethyl hexyl ketone as in Example V.

Example VII

To the reaction vessel as used in Example II there were charged 60 grams of propionaldehyde, 35 grams of 1-hexene, and 12 grams of lauroyl peroxide. The mixture was heated at 70° C. for 5 hours. At the end of this time 55% of the olefin had reacted. The chief product was ethyl hexyl ketone as in Example VI.

Example VIII

To the reaction vessel as used in Example II there were charged 24.5 grams of 1-heptene, 54.0 grams of n-butyraldehyde, and 16 grams of di-tertiary-butyl peroxide. The vessel was heated to 115° C. for 3 hours. After removing the unreacted heptene and aldehyde, the resulting product was found to have a molecular weight of 206 and a carbonyl value of 0.41 equivalent per 100 grams. The product was estimated from analyses to contain 85% to 90% of heptyl propyl ketone.

Example IX

There were charged to the reaction vessel as used in Example II 0.734 mole of 1-hexene and 0.367 mole of isobutyraldehyde and there was added 0.022 mole of di-tertiary-butyl peroxide. The mixture was heated in the closed vessel for 22 hours at 120° C. and then steam-distilled to recover the resulting ketone. It was found that 73% by volume of the products were steam-distillable, the chief product being isopropyl hexyl ketone.

Example X

There were charged to the reaction vessel as used in Example II 0.650 mole of n-heptaldehyde, 0.325 mole of 1-hexene, and 0.0195 mole of di-tertiary-butyl peroxide. The mixture was heated in the closed vessel for 22 hours at 120° C. There were obtained 30.5 cc. of products containing as the principal product dihexyl ketone.

Example XI

There were charged to the reaction vessel as used in Example II 0.308 mole of 2-ethyl-hexenal and 0.616 mole of 1-hexene and 2 mole per cent of di-tertiary-butyl peroxide was added. The mixture was heated for 22 hours at 120° C. The principal product, which was recovered by vacuum distillation, was hexyl 2-heptyl ketone.

Example XII

There were charged to the reaction vessel as used in Example II 0.816 mole of 1-hexene and 0.408 mole of acetaldehyde and 2 mole per cent of di-tertiary-butyl peroxide was added. The mixture was heated for 22 hours at 120° C. and then steam-distilled. The principal product was methyl hexyl ketone.

Example XIII

There were charged to the reaction vessel 90 cc. of water, 1.8 grams of sodium lauryl sulfate, 3.7 grams of 2,2-bis(tertiary-butylperoxy)butane, 44 grams of 1-octene and 23 grams of propionaldehyde. The mixture was heated at 97° C. for 37.5 hours and then steam-distilled. Ethyl octyl ketone was obtained as the chief product.

This application is a continuation-in-part of our copending application Serial No. 769,064, filed August 16, 1947.

We claim as our invention:

1. Process of preparing a dialkyl ketone from an olefin and an aldehyde, said ketone containing carbon atoms equal in number to the sum of the number of carbon atoms in one molecule of each of said reactants, which process comprises heating together, in the presence of a free radical reaction initiator of the class consisting of positive halogen compounds and peroxidic compounds, an alpha-monoolefin hydrocarbon of the formula $R-CH=CH_2$, wherein R is an alkyl group having not less than four carbon atoms, and an alkanal containing not less than two carbon atoms, said reactants being present in the reaction theatre in the proportion of from about 20 moles of olefin per mole of alkanal to about 1 mole of olefin per 20 moles of alkanal, and isolating said dialkyl ketone.

2. Process of preparing a dialkyl ketone from an olefin and an aldehyde, said ketone containing carbon atoms equal in number to the sum of the number of carbon atoms in one molecule of each of said reactants, which process comprises heating together, in the presence of actinic light, an alpha-monoolefin hydrocarbon of the formula $R-CH=CH_2$, wherein R is an alkyl group having not less than four carbon atoms, and an alkanal containing not less than two carbon atoms, said reactants being present in the reaction theatre in the proportion of from about 20 moles of olefin per mole of alkanal to about 1 mole of olefin per 20 moles of alkanal, and isolating said dialkyl ketone.

3. Process of preparing a dialkyl ketone from an olefin and an aldehyde, said ketone containing carbon atoms equal in number to the sum of the number of carbon atoms in one molecule of each of said reactants, which process comprises heating together, in the presence of a peroxidic catalyst, a normal alpha-monoolefin hydrocarbon having not less than eight carbon atoms, and an alkanal containing not less than two carbon atoms, said reactants being present in the reaction theatre in the proportion of from about 20 moles of olefin per mole of alkanal to about 1 mole of olefin per 20 moles of alkanal, and isolating said dialkyl ketone.

4. Process of preparing a 1:1 adduct of an olefin and an aldehyde, which process comprises heating together from 0.5 to 2.5 moles of propionaldehyde and one mole of a normal alpha-monoolefin hydrocarbon having not less than six carbon atoms in the presence of a peroxidic catalyst until there is formed as the 1:1 adduct ethyl alkyl ketone wherein the alkyl is equal in chain-length to the alpha-monoolefin hydrocarbon and isolating said 1:1 adduct.

5. Process of preparing a 1:1 adduct of an olefin and an aldehyde, which process comprises heating together from 0.5 to 2.5 moles of acetaldehyde and one mole of a normal alpha-monoolefin hydrocarbon having not less than six carbon atoms in the presence of a peroxidic catalyst until there is formed as the 1:1 adduct methyl alkyl ketone wherein the alkyl is equal in chain-length to the alpha-monoolefin hydrocarbon and isolating said 1:1 adduct.

6. Process for preparing a 1:1 adduct of an olefin and an aldehyde, which process comprises heating together one mole of propionaldehyde and one mole of 1-octene in the presence of ditertiary-butyl peroxide at about 120° C. until 3-undecanone is formed as the 1:1 adduct and isolating said 3-undecanone.

7. Process of preparing a 1:1 adduct of an olefin and an aldehyde, which process comprises heating together one mole of acetaldehyde and one mole of 1-hexene in the presence of ditertiary-butyl peroxide at about 120° C. until 2-octanone is formed as the 1:1 adduct and isolating said 2-octanone.

FREDERICK F. RUST.
WILLIAM E. VAUGHAN.

References Cited in the file of this patent

UNITED STATES PATENTS

| Number | Name | Date |
|---|---|---|
| 2,432,287 | Cramer | Dec. 9, 1947 |
| 2,440,800 | Hanford et al. | May 4, 1948 |
| 2,517,684 | Ladd | Aug. 8, 1950 |
| 2,533,944 | Ladd | Dec. 12, 1950 |